US005678975A

United States Patent [19]

Okabe et al.

[11] Patent Number: 5,678,975

[45] Date of Patent: Oct. 21, 1997

[54] WASTE CONTAINER THROW-IN SYSTEM FOR BUILDINGS

[75] Inventors: Yonosuke Okabe; Takao Sekigawa, both of Utsunomiya, Japan

[73] Assignee: Fuji Jukogyo Kabushiki Kaisha, Tokyo, Japan

[21] Appl. No.: 570,342

[22] Filed: Dec. 11, 1995

[30] Foreign Application Priority Data

Dec. 22, 1994 [JP] Japan ........................ 6-320289

[51] Int. Cl.[6] ........................ B65G 11/02

[52] U.S. Cl. ........................ 414/403; 52/195; 209/908; 209/930; 193/2 R; 414/378; 414/414; 414/397

[58] Field of Search ........................ 193/16.29, 30, 193/2 R; 414/397, 403, 404, 414, 343, 378, 345, 358, 387, 376, 349; 52/195; 209/375, 908, 930

[56] References Cited

U.S. PATENT DOCUMENTS 5,551,576 9/1996 Importico ........................ 193/2 R

FOREIGN PATENT DOCUMENTS 524416 5/1931 Germany ........................ 414/397
1106046 5/1961 Germany ........................ 414/414
275303 11/1989 Japan ........................ 414/403
66402 3/1992 Japan ........................ 414/397

*Primary Examiner*—Frank E. Werner
*Attorney, Agent, or Firm*—Beveridge, DeGrandi, Weilacher & Young, L.L.P.

[57] ABSTRACT

A waste container throw-in system of a building, comprises a container holder for holding a waste container therein, a handcart for carrying the container holder thereon, a vertical conveyor tube vertically provided in the building, a waste throw-in apparatus including a frame structure and miscellaneous actuators, an inserting tube inserted in the vertical conveyor tube and a central control system for controlling the waste throw-in apparatus. When a collector carries the handcart to the waste throw-in apparatus and couples therewith, the container holder is lifted up from the handcart and moved in the horizontal direction toward the vertical conveyor tube with the help of the actuators. Then, the inserting tube is removed from the vertical conveyor tube and instead thereof the container holder is inserted in the vertical conveyor tube, whereby the waste container is thrown into the vertical conveyor tube. After the waste container is thrown in, the container holder is returned to the handcart and at the same time the inserting tube is inserted in the vertical conveyor tube. These operations are automatically conducted under the control of the central control apparatus of the waste container throw-in system.

13 Claims, 7 Drawing Sheets

WASTE CONTAINER THROW-IN SYSTEM FOR BUILDINGS

BACKGROUND OF THE INVENTION

1. Field of the Invention

The present invention relates to a waste container throw-in system for buildings and particularly to a waste container throw-in system wherein wastes collected in floors of a multistoried building are packed into a capsule or a waste container to be thrown into a vertical conveyer tube installed in the building.

2. Prior Art

In recent years, more buildings have been multistoried and are becoming tall. Therefore, the amount of wastes produced in those buildings is increasing and waste disposal is becoming a problem in the maintenance of buildings.

In view of these situations, several waste container conveyer systems for buildings which can swiftly collect and discharge wastes out of buildings without spending men's labor have been proposed to date. FIG. 11 to FIG. 13 show a waste container conveyor apparatus for buildings disclosed in Japanese Patent Unexamined Application No. Toku-Kai-Hey 4-148701. Referring now to FIG. 11, in a multistoried building B a vertical conveyor tube 1 is vertically installed extendedly from a top floor to a bottom floor and a waste throw-in apparatus 2 furnished in each floor of the building is connected with the vertical conveyor tube 1. The waste bags 7 are collected in a waste container 6 made by a pliable synthetic resin sheet and the like. The waste container 6 is contained in a container holder 4 mounting on a handcart 3 as shown in FIG. 12. The container holder 4 is open upward and closed downward with a slidable bottom cover 5. After the waste container 6 is filled up, it is bound at the upper end thereof to make one capsule 6.

The handcart 3 containing the capsule 6 is conveyed to the waste throw-in apparatus 2 and the slidable bottom cover 5 of the container holder 4 is opened there. Thus, the capsule 6 falls into a cylindrical container 9 as shown in FIG. 13 and after that the cylindrical container 9 is horizontally pushed aside. When the cylindrical container 9 is moved, since it is connected with an intermediate cylinder 10 constituting a part of the vertical conveyor tube 1, at the same time the intermediate cylinder 10 is also pushed aside and goes out of the vertical conveyor tube 1. Then, the cylindrical container 9 is inserted into the vertical conveyor tube 1 in place of the intermediate cylinder 10.

Thus, the capsule 6 in the cylindrical container 9 falls in the vertical conveyor tube 1 and conveyed to a waste disposal chamber 11. In order to make a soft landing on the lower end of the vertical conveyor tube 1, the air pressure below the capsule 6 is adjusted according to the weight of the capsule for giving an appropriate brake to the falling capsule 6.

However, since the waste container conveyor system as described above is constituted such that wastes collected by the handcart is once dropped onto a container and then the container is thrown into the vertical conveyor tube, there are miscellaneous problems which will be described below.

That is to say, when the waste throw-in apparatus is installed under the floor of a building, it is necessary to use large scale equipments such as cranes and the like and consequently dangerous and time-consuming work is needed. Further, since the hole for installation works must be larger than the waste throw-in apparatus, a troublesome and costly work is needed when the floor surface is restored after installation.

Further, when the capsule 6 is dropped from the container holder 4 into the cylindrical container 9, it makes a big noise because waste cans or waste bottles are contained therein.

Further, since the container holder 4 needs a bottom cover 5, the construction of the handcart 3 becomes complicated and heavier and its handling becomes more sophisticated.

SUMMARY OF THE INVENTION

Accordingly, the present invention is intended to obviate the abovementioned problems and disadvantages of the prior waste container conveyor system and the objects of the present invention will be summarized as follows.

It is an object of the present invention to provide a waste container throw-in system capable of throwing a waste container directly into ,a vertical conveyor tube without transferring the waste container to another container.

It is another object of the present invention to provide a waste container throw-in system whose construction is simple and whose installation cost is inexpensive.

In order to attain these objects, the waste container throw-in system for a building according to the present invention comprises: a waste container for containing wastes therein, a vertical conveyor tube including a uniform inner diameter and vertically provided in the building for downward conveying the waste container by gravity, a waste throw-in apparatus provided on a floor of the building for throwing the waste container into the vertical conveyor tube and a control apparatus for controlling the waste throw-in apparatus, a container holder for containing the waste container; a container cart for detachably mounting the container holder thereon and for carrying the container holder; holding means for positioning the container holder at a predetermined position of the container cart and for holding said container holder at said predetermined position on the container cart; an inserting tube having an inner diameter equal to the inner diameter of the vertical conveyor tube and provided in the waste throw-in apparatus and horizontally inserted in the vertical conveyor tube so as to coincide the inner diameter of the inserting tube with the inner diameter of the vertical conveyor tube; jointing means provided in the inserting tube for mechanically jointing the container holder with the inserting tube so as to integrally move the inserting tube together with the container holder; positioning means for positioning the container cart at a predetermined position wherein the container holder is jointed with the inserting tube and locking the container cart at the predetermined position; disengaging means provided in the inserting tube for disengaging the container holder from the container cart; moving means provided in the waste throw-in apparatus for horizontally moving the inserting tube out of the vertical conveyor tube and for horizontally inserting the container holder containing the waste container into the vertical conveyor tube in place of the inserting tube so as to throw only the waste container into the vertical conveyor tube; returning means provided in the waste throw-in apparatus for horizontally moving the container holder out of the vertical conveyor tube and for returning the inserting tube to the vertical conveyor so as to make coincident the inner diameter of the inserting tube with the inner diameter of the vertical conveyor tube after the waste container is thrown into the vertical container; engaging means provided in the inserting tube for replacing the container holder at the predetermined position of the container cart and for engaging the container holder with the container cart; unlocking means provided in the waste throw-in apparatus for unlocking the container cart so as to release the container cart from the waste throw-in apparatus; and control means for automatically controlling the jointing means, the positioning means, the disengaging means, the moving means, the returning means, the engaging means and the unlocking means according to the electronic control apparatus.

BRIEF DESCRIPTION OF THE DRAWINGS

A specific embodiment of the present invention will be described with reference to the accompanying drawings, in which.

DETAILED DESCRIPTION OF PREFERRED EMBODIMENTS

Figure 1:
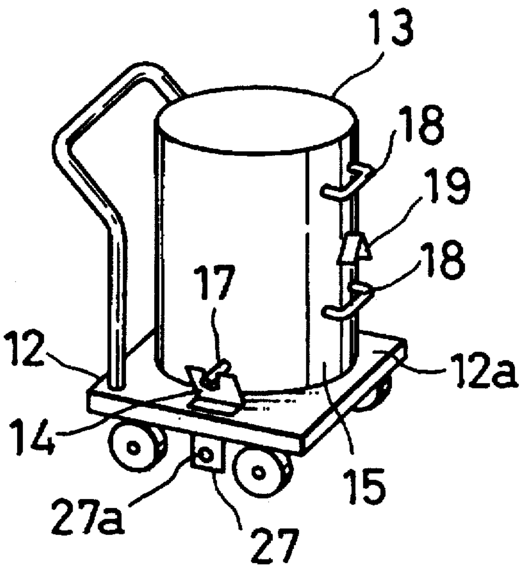
FIG. 1 is a perspective view showing a handcart and a container holder according to an embodiment of a waste container throw-in system for buildings based on the the present invention.
Figure 2:
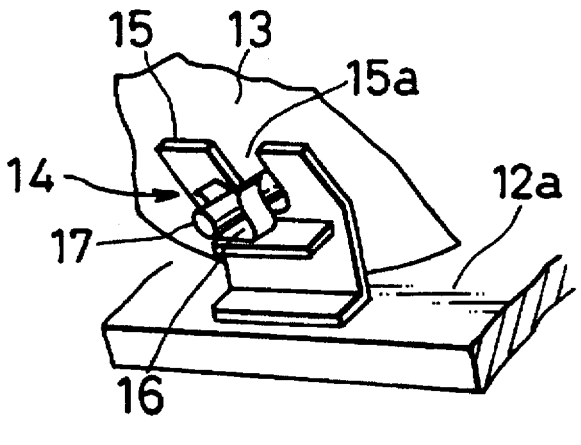
FIG. 2 is an enlarged perspective view showing a elastic stopper member according to an embodiment of the present invention.

Referring now to FIG. 1, a container holder 13 is detachably mounted on a handcart 12. The container holder 13 is a cylindrical holder which is open both upward and downward. On a floor 12*a* of the handcart 12 a pair of spring stoppers 14 are fixed at an interval slightly larger than the diameter of the container holder 13. The spring stopper 14 comprises, as shown in FIG. 2, a bracket 15 connected with the floor 12*a* and a plate spring 16 fixed on the bracket 15. The bracket 15 has a notch 15*a* at the upper end thereof. On the other hand, a pair of pins 17 are provided on opposite sides of the container holder 13 respectively. When the container holder 13 is mounted on the floor 12*a* of the handcart 12, the pin 17 is put in the notch 15*a* and clipped by the plate spring 16. When the container holder 13 is lifted up, the pin 17 is taken off the spring stopper 14.

On the outer periphery surface of the container holder 13, two hook holders (hereinafter referred to "eyes") 18 are fixed thereto and an inverted V-shaped guide member 19 is connected therewith between two hook holders 18. These are positioned in a row along a vertical line.

Figure 3:
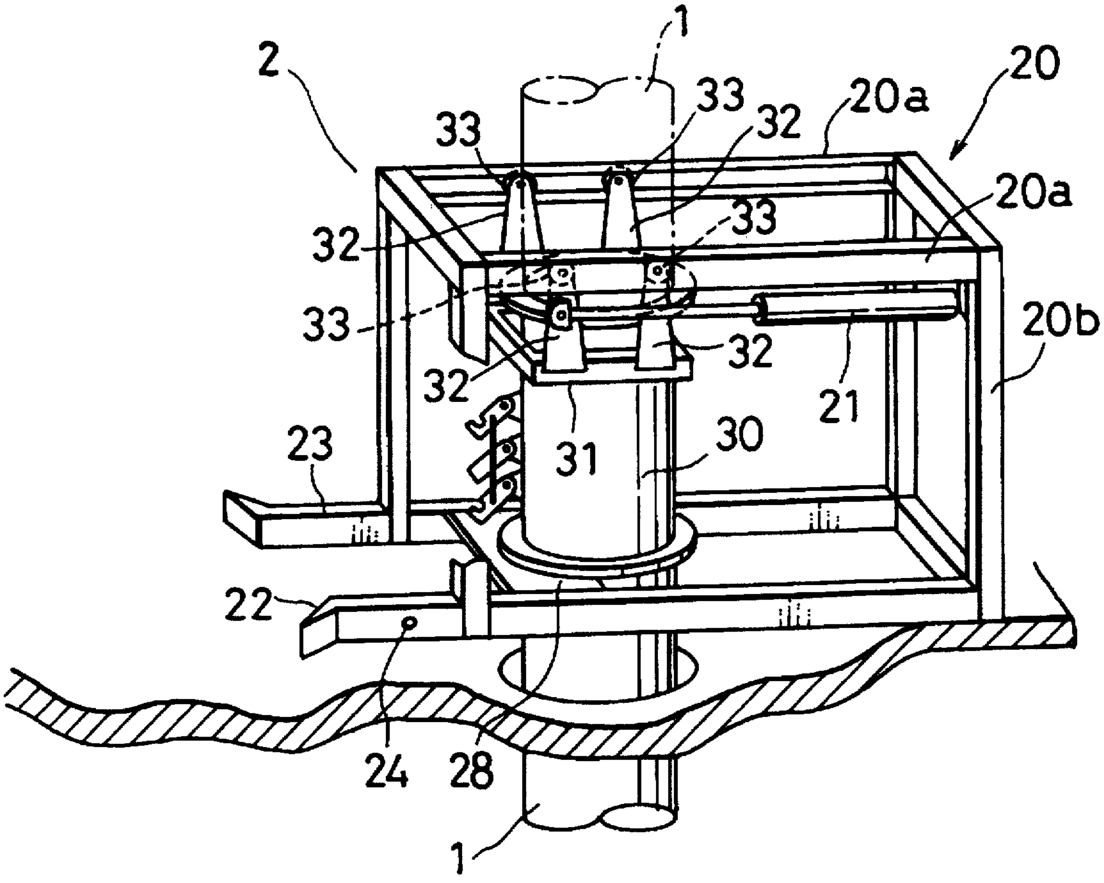
FIG. 3 is a perspective view showing a waste container throw-in apparatus according to an embodiment of the present invention.
Figure 4:
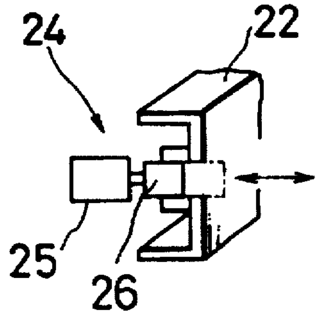
FIG. 4 is an enlarged perspective view showing a cart lock mechanism according to an embodiment of the present invention.

FIG. 3 shows a waste throw-in apparatus 2 which roughly comprises a rectangular parallelepiped frame structure 20, an inserting tube 30 and a mechanism for moving the inserting tube 30. A vertical conveyor tube 1 goes through the frame structure 20 in the vertical direction. A rail is respectively provided on upper frames 20*a* which is parallel with each other in the frame structure 20. Further, a throw-in cylinder 21 is connected at the rear end thereof with a vertical frame 20*b*. Further, a pair of guide rods 22, 23 are extended from the lower frames of the frame structure 20 for guiding the handcart 12 to a predetermined position, i.e., a position from which the container holder 13 is lifted up. A lock mechanism 24 is equipped with the guide rod 22 and the lock mechanism 24 comprises a cylinder 25 and a stopper pin 26 moved by the cylinder 25, as illustrated in FIG. 4. The stopper pin 26 is for positioning the handcart 12 at the position from which the container holder 13 is lifted up by inserting the stopper pin 26 into a hole 27*a* of a bracket 27 fixed to the handcart 12 as shown in FIG. 1.

Figure 10:
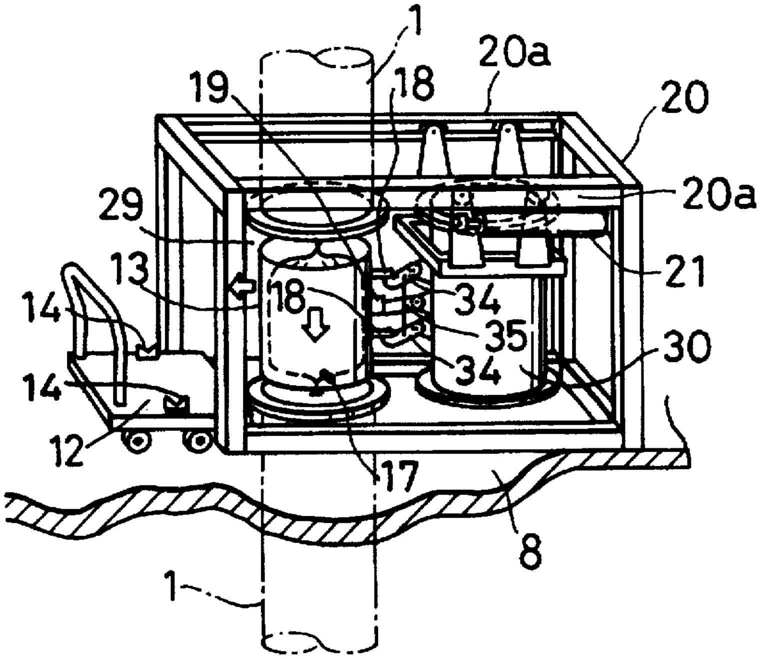
FIG. 10 is a perspective view showing an operation of a waste throw-in apparatus according to an embodiment of the present invention.
Figure 11:
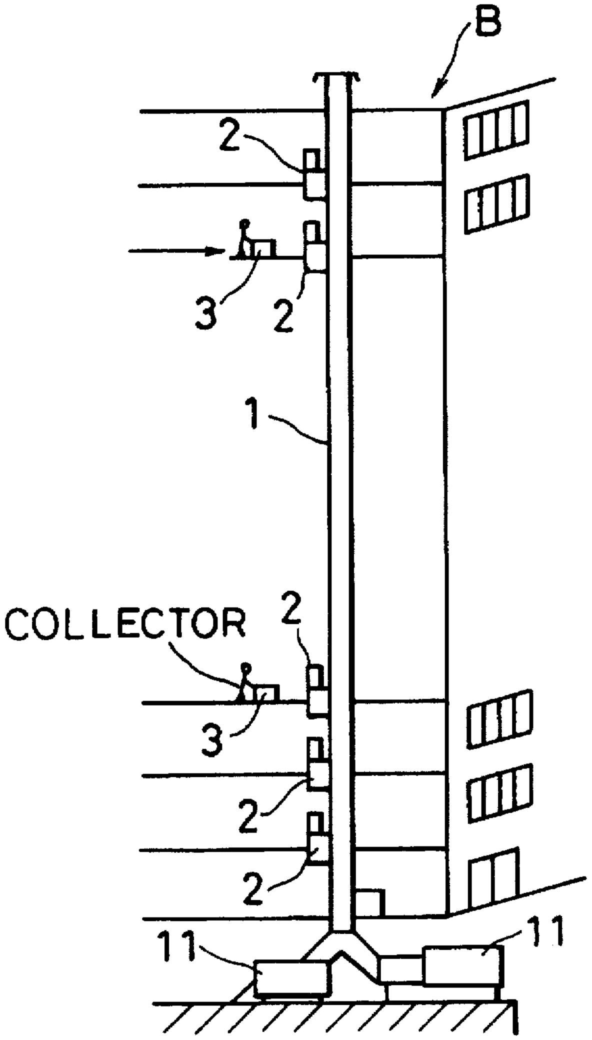
FIG. 11 is a schematic view showing a waste container throw-in system for buildings according to a prior art.
Figure 12:
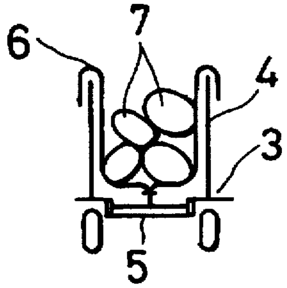
FIG. 12 is a schematic view showing a handcart used in a waste container throw-in system for buildings according to a prior art.
Figure 13:
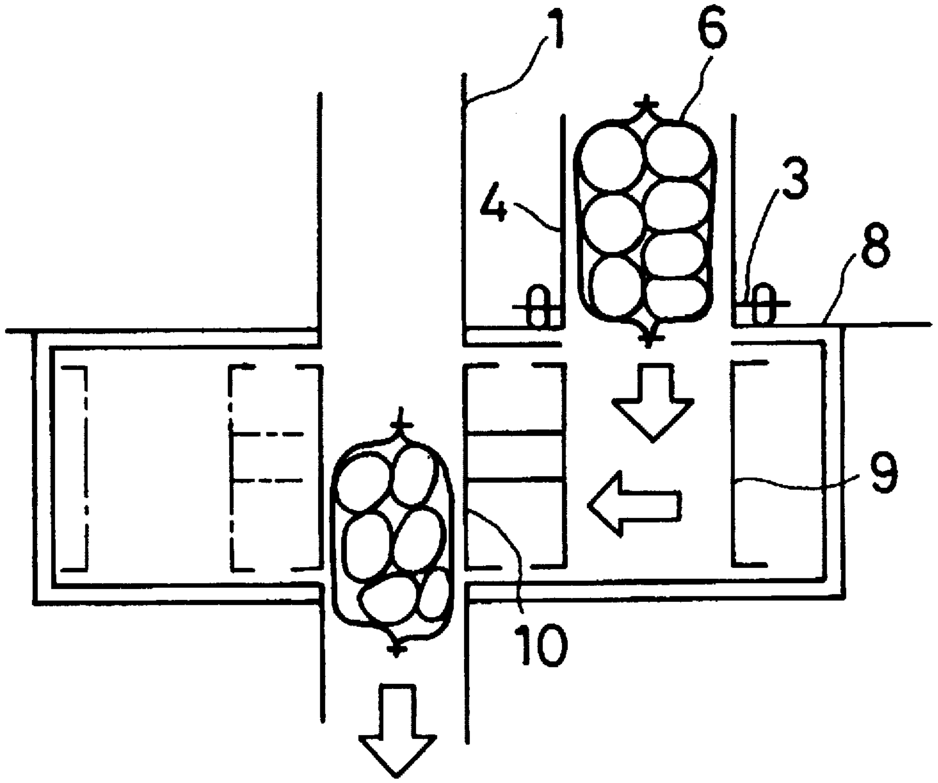
FIG. 13 is a schematic view showing a waste container throw-in system for buildings according to a prior art.

The floor 28 of the waste throw-in apparatus 2 is leveled with the floor 12*a* of the handcart 12. The vertical conveyor tube 1 is transversally cut off at the waste throw-in apparatus 2 and therefore it has an upper open end and a lower open end. Thus, here a throw-in port 29 is formed as shown in FIG. 10 and the inserting tube 30 is inserted between these upper and lower open ends in such a way that it can be freely engaged or disengaged. A rectangular flange 31 is provided at the upper end of the inserting tube 30 and four brackets 32 are extended from the flange 31. A wheel 33 is rotatably connected with the upper end of the brackets 32 respectively and rides on the rail (upper frame) 20*a* for hanging the inserting tube 30 through the bracket 32.

Figure 9:
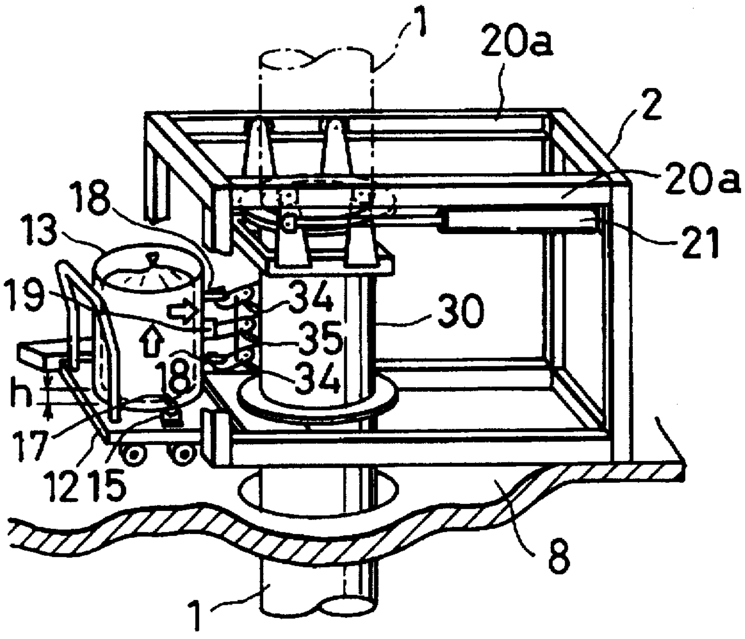
FIG. 9 is a perspective view showing an operation of a waste throw-in apparatus according to an embodiment of the present invention.

Since the front end of the throw-in cylinder 21 is connected with one of the brackets 32, the inserting tube 30 is moved in the horizontal direction along the rail 20*a* by the force of the throw-in cylinder 21. Thus, the inserting tube 30 is moved between a throw-away position as shown in FIG. 9 and a shunting position as shown in FIG. 10.

Figure 5:
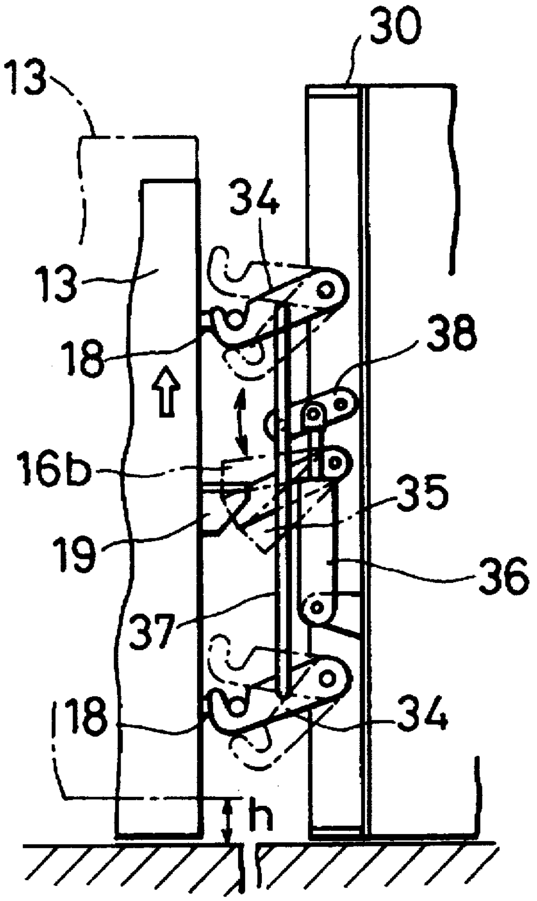
FIG. 5 is an enlarged plan view showing a lift mechanism according to an embodiment of the present invention.
Figure 6:
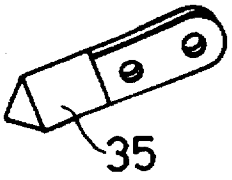
FIG. 6 is a fragmentary perspective view showing a guide of a lift mechanism according to an embodiment of the present invention.

Referring to FIG. 5, this indicates a lift mechanism provided on the periphery surface of the inserting tube 30. The lift mechanism comprises a pair of hooks 34 for hooking the eye 18 of the container holder 13, a guide 35 for engaging the guide member 19 thereof, a lift cylinder 36, a link 38 and a rod 37 for swingably operating the pair of hooks 34 and the guide 35 by the force of the lift cylinder 36. The rod 37 is rotatably linked with the pair of hooks 34, the guide 35 and the link 38 which is rotatably linked with the lift cylinder 36. When the lift cylinder 36 is actuated, the link 38 is swung and the rod 37 is moved up and down, whereby the pair of hooks 34 and the guide 35 are swingably moved accordingly. According to the movement of the rod 37, the hooks 34 are engaged with the eye 18 and lift up the container holder 13. Finally, the container holder 13 is lifted up as high as a specified height "h" and is held at a position shown by a one-dot chain line in FIG. 5.

Next, an operation of the embodiment will be described.

An operator (collector) carries the handcart 12 around the floor of the building for collecting waste bags. When the operator finishes wastes collection, he or she binds the upper end of the synthetic resin sheet containing waste bags therein to make a capsule 6 and then the operator carries the handcart 12 with the container holder 13 containing the capsule 6 to the waste throw-in apparatus 2 at which a handcart 12A boarding a vacant container holder 13A is located. The operator takes out the handcart 12A from the waste throw-in apparatus 2 and inserts the handcart 12 containing the capsule 6 between the guide rods 22 and 23 in place of the vacant handcart 12A.

The handcart 12 is guided by the guide rods 22 and 23 and touches the floor 28 of the waste throw-in apparatus 2 for stopping. The position where the handcart 12 stops is a lifting position. At the lifting position, the stopper pin 26 of the lock mechanism 24 is inserted into the hole 27*a* of the bracket 27 for stopping the handcart 12 there. In this state, the eyes 18 and the guide member 19 of the container holder 13 are faced with the hooks 34 and the guide 35 of the inserting tube 30 respectively. The handcart 12A boarding the vacant waste container 13A is used for collecting wastes thereinafter. The operator does not need any further operation, because the operation thereinafter, as described next, is performed automatically according to the instruction of the central control apparatus (not shown).

First, the hooks 34 and the guide 35 of the inserting tube 30 are moved by the lift cylinder 36 and are engaged with the eyes 18 and the guide member 19 respectively. After the engagement, the hooks 34 lift up the container holder 13 as much as a short distance "h" by the further movement of the lift cylinder 36 and the pin 17 is detached from the notch 15*a* of the bracket 15. At this time, the wedge-shaped guide 35 acts as positioning the container holder 13 in the left and right directions.

After that, the throw-in cylinder 21 is shrunk and it moves both the inserting tube 30 and the container holder 13 being lifted and held by the inserting tube 30 as long as a specified value along the rail 20*a* in the horizontal direction, thus the inserting tube 30 is moved from the throw-in port 29 to the shunting position. At this moment, the capsule 6 leaves the container holder 13 and drops along the vertical conveyor tube 1.

Figure 7:
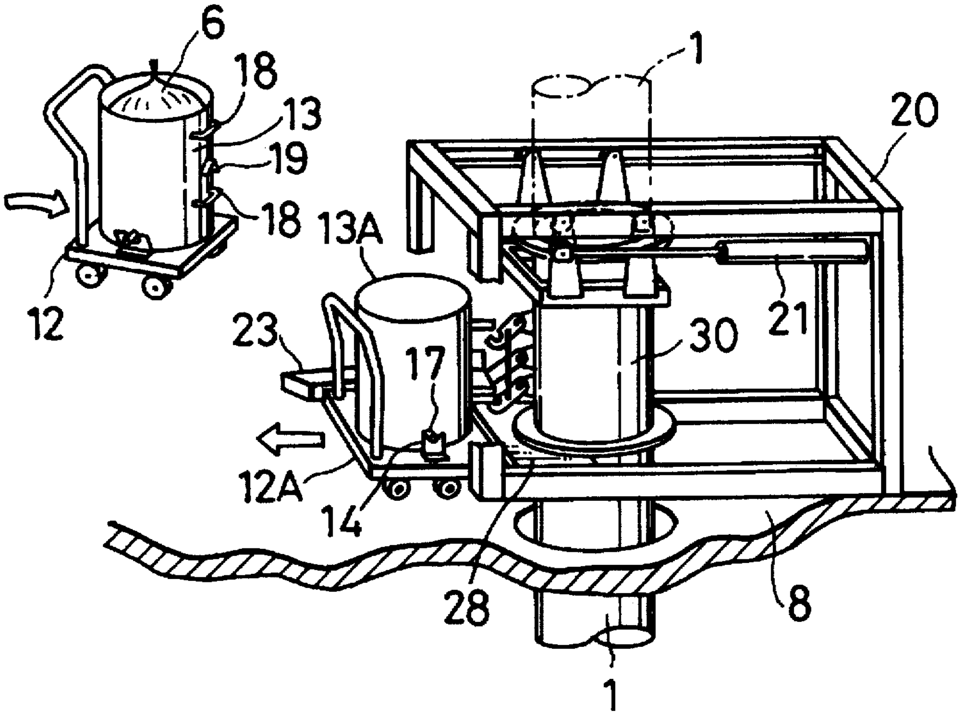
FIG. 7 is a perspective view showing an operation of a waste throw-in apparatus according to an embodiment of the present invention.
Figure 8:
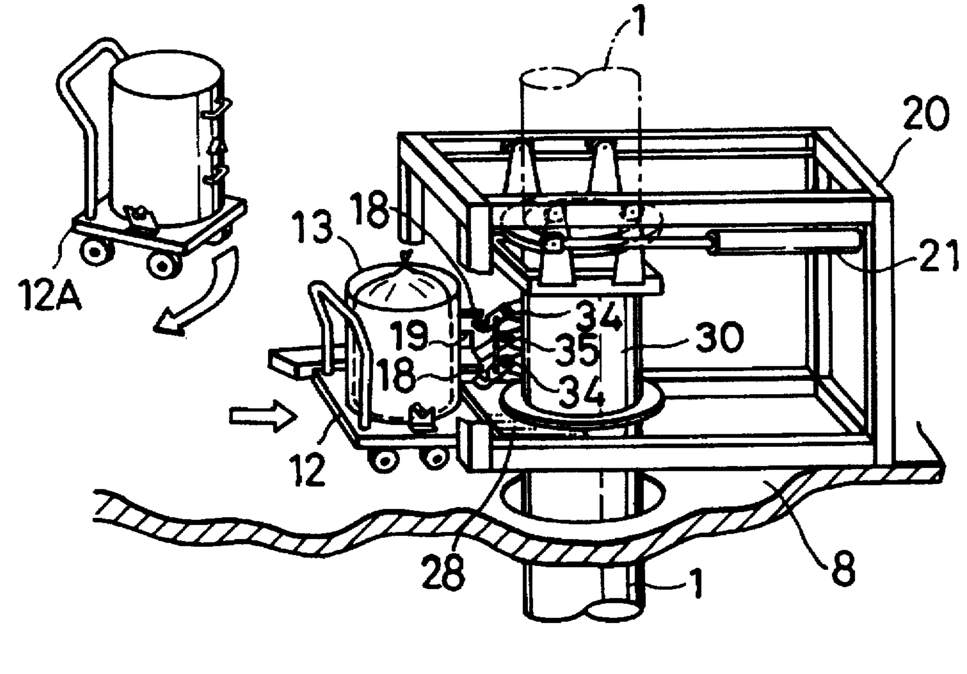
FIG. 8 is a perspective view showing an operation of a waste throw-in apparatus according to an embodiment of the present invention.

Next, the throw-in cylinder 21 moves back the inserting tube 30 from the shunting position to the initial throw-in position and inserts the inserting tube 30 into the vertical conveyor tube 1. At the same time, the container holder 13 is moved back from the vertical conveyor tube 1 to the handcart 12. Then, the hooks 34 of the inserting tube 30 bring down the container holder 13 onto the handcart 12. When the container holder 13 is mounted on the handcart 12, the pin 17 is clipped by the spring stopper 14 automatically. Thus, the system returns to the initial state as illustrated in FIG. 7.

The operational timings of the throw-in cylinder 21 and the lift cylinder 36 are determined based on the instruction of the central control apparatus, For example, the timing of the container holder 13 being inserted into the vertical conveyor tube 1 is determined so as to avoid the timing when another capsule is falling from some other floor.

In this embodiment, as actuating means of the waste throw-in apparatus, air or hydraulic cylinders are employed, however, instead of cylinders, electric motors may be employed for the same purposes, Further, in place of the handcart, some electrically driven carts can be one of variations of the embodiment.

In summary, since the waste throw-in apparatus according to the embodiment of the present invention is installed on the floor of the building, the construction on the floor, is only associated with borings of through holes for the vertical conveyor tube and therefore the installation cost of the waste container conveyor system can be largely reduced.

Further, concerning the container holder, upper and lower ends thereof are both opened to outside and therefore the construction is very simple and its manufacturing cost is low.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A waste container throw-in system of a building having a waste container for containing wastes therein, a vertical conveyor tube including a uniform inner diameter and vertically provided in said building for downward conveying said waste container by gravity, a waste throw-in apparatus provided on a floor of said building for throwing said waste container into said vertical conveyor tube and an electronic control apparatus for controlling said waste throw-in apparatus, comprising:

a container holder for containing said waste container;

an inserting tube having an inner diameter equal to said inner diameter of said vertical conveyor tube and provided in said waste throw-in apparatus and horizontally inserted in said vertical conveyor tube so as to make coincident said inner diameter of said inserting tube with said inner diameter of said vertical conveyor tube;

jointing means provided in said inserting tube for mechanically jointing said container holder with said inserting tube so as to integrally move said container holder with said inserting tube;

moving means provided in said waste throw-in apparatus for horizontally moving said inserting tube out of said vertical conveyor tube and for horizontally inserting said container holder containing said waste container into said vertical conveyor tube in place of said inserting tube so as to throw only said waste container into said vertical conveyor tube;

returning means provided in said waste throw-in apparatus for horizontally moving said container holder out of said vertical conveyor tube and for returning said inserting tube to said vertical conveyor so as to make coincident said inner diameter of said inserting tube with said inner diameter of said vertical conveyor tube after said waste container is thrown into said vertical container; and control means for automatically controlling said jointing means and said moving means according to said electronic control apparatus.

2. The waste container throw-in system according to claim 1, wherein said waste throw-in apparatus is installed on said floor of said building.

3. The waste container throw-in apparatus according to claim 1, wherein said container holder is open at the bottom thereof.

4. The waste container throw-in system according to claim 1, wherein said jointing means comprise a pair of hook holders provided on an outer surface of said container holder, a pair of hooks provided on an outer surface of said inserting tube and a pneumatic actuator provided on the outer surface of said inserting tube for operating said hooks.

5. The waste container throw-in system according to claim 1, wherein said jointing means comprise a pair of hook holders provided on an outer surface of said container holder, a pair of hooks provided on an outer surface of said inserting tube and a hydraulic actuator provided on the outer surface of said inserting tube for operating said hooks.

6. The waste container throw-in system according to claim 1, wherein said moving means and said returning means comprise a pair of rails horizontally extending in parallel with each other for holding said inserting tube and for moving said inserting tube along said rails and a pneumatic actuator for driving said inserting tube.

7. The waste container throw-in system according to claim 1, wherein said moving means and said returning means comprise a pair of rails horizontally extending in parallel with each other for holding said inserting tube and for moving said inserting tube along said rails and an electric motor for driving said inserting tube.

8. A waste container throw-in system of a building having a waste container for containing wastes therein, a vertical conveyor tube including a uniform inner diameter and vertically provided in said building for downward conveying said waste container by gravity, a waste throw-in apparatus provided on a floor of said building for throwing said waste container into said vertical conveyor tube and an electronic control apparatus for controlling said waste throw-in apparatus, comprising:

a container holder for containing said waste container;

a container cart for detachably mounting said container holder thereon and for carrying said container holder;

holding means for positioning said container holder at a predetermined position of said container cart and for holding said container holder at said predetermined position on said container cart;

an inserting tube having an inner diameter equal to said inner diameter of said vertical conveyor tube and provided in said waste throw-in apparatus and horizontally inserted in said vertical conveyor tube so as to make coincident said inner diameter of said inserting tube with said inner diameter of said vertical conveyor tube;

jointing means provided in said inserting tube for mechanically jointing said container holder with said inserting tube so as to integrally move said inserting tube with said container holder;

positioning means for positioning said container cart at a predetermined position wherein said container holder is jointed with said inserting tube and locking said container cart at said predetermined position;

disengaging means provided in said inserting tube for disengaging said container holder from said container cart;

moving means provided in said waste throw-in apparatus for horizontally moving said inserting tube out of said vertical conveyor tube and for horizontally inserting said container holder containing said waste container into said vertical conveyor tube in place of said inserting tube so as to throw only said waste container into said vertical conveyor tube;

returning means provided in said waste throw-in apparatus for horizontally moving said container holder out of said vertical conveyor tube and for returning said inserting tube to said vertical conveyor so as to make coincident said inner diameter of said inserting tube with said inner diameter of said vertical conveyor tube after said waste container is thrown into said vertical container;

engaging means provided in said inserting tube for replacing said container holder at said predetermined position of said container cart and for engaging said container holder with said container cart;

unlocking means provided in said waste throw-in apparatus for unlocking said container cart so as to release said container cart from said waste throw-in apparatus; and control means for automatically controlling said jointing means, said jointing means, said positioning means, said disengaging means, said moving means, said returning means, said engaging means and said unlocking means according to said electronic control apparatus.

9. The waste container throw-in apparatus according to claim 8, wherein said container holder is open at the bottom thereof.

10. The waste container throw-in system according to claim 8, wherein said jointing means comprise a pair of hook holders provided on an outer surface of said container holder, a pair of hooks provided on an outer surface of said inserting tube and a pneumatic actuator provided on the outer surface of said inserting tube for operating said hooks.

11. The waste container throw-in system according to claim 8, wherein said jointing means comprise a pair of hook holders provided on an outer surface of said container holder, a pair of hooks provided on an outer surface of said inserting tube and a hydraulic actuator provided on the outer surface of said inserting tube for operating said hooks.

12. The waste container throw-in system according to claim 8, wherein said moving means, and said returning means comprise a pair of rails horizontally extending in parallel with each other for holding said inserting tube and for moving said inserting tube along said rails and a pneumatic actuator for driving said inserting tube.

13. The waste container throw-in system according to claim 8, wherein said moving means and said returning means comprise a pair of rails horizontally extending in parallel with each other for holding said inserting tube and for moving said inserting tube along said rails and an electric motor for driving said inserting tube.

* * * * *